(12) United States Patent
Mamiya et al.

(10) Patent No.: US 6,680,742 B2
(45) Date of Patent: Jan. 20, 2004

(54) IMAGE DISPLAY DATA CONVERSION APPARATUS AND METHOD THEREOF

(75) Inventors: Johji Mamiya, Sagamihara (JP); Yoh Sugiuchi, Tokyo (JP); Kazushi Yamauchi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/682,680

(22) Filed: Oct. 4, 2001

(65) Prior Publication Data

US 2002/0039109 A1 Apr. 4, 2002

(30) Foreign Application Priority Data

Oct. 4, 2000 (JP) ........................................ 2000-304619

(51) Int. Cl.$^7$ ................................................. G09G 5/00
(52) U.S. Cl. .................... 345/660; 345/606; 345/667; 345/668; 345/671
(58) Field of Search ............................... 345/606, 660, 345/667, 668, 671

(56) References Cited

U.S. PATENT DOCUMENTS

| 4,682,161 A | * | 7/1987 | Bugg | 345/472.2 |
| 5,748,192 A | * | 5/1998 | Lindholm | 345/649 |
| 5,844,541 A | * | 12/1998 | Cahill, III | 345/667 |
| 5,970,173 A | * | 10/1999 | Lee et al. | 382/236 |
| 6,417,866 B1 | * | 7/2002 | Man et al. | 345/660 |
| 6,525,734 B2 | * | 2/2003 | Sato et al. | 345/472 |
| 2002/0000998 A1 | * | 1/2002 | Scott et al. | 345/667 |

FOREIGN PATENT DOCUMENTS

JP 2001-166761 6/2001 ............ G09G/5/00

* cited by examiner

Primary Examiner—Matthew C. Bella
Assistant Examiner—Mike Rahmjoo
(74) Attorney, Agent, or Firm—Derek S Jennings (57) ABSTRACT

An image display system includes a host side for executing an application and transmitting image data having a P dot width in a block unit with the number of m dots as the width of the block. A panel side is connected through a digital I/F line to the host side, which converts the image data having a P dot width by using magnification to produce data having an R dot width and then displays the image data. The panel side executes scaling by using a block having an integral value obtained by a R×m/P set as a dot width and a block having a dot width of an added integral value obtained by adding 1 to the integral value, and converts by magnification the image data received from the host side in block unit based on the executed scaling and displays the image data on a panel.

18 Claims, 10 Drawing Sheets

| SET UP : | P/2→Latch A | 320/2→A | SELECTION |
|---|---|---|---|
| 1ST: | 160 − 64 = 96 | 96→A | 51 |
| 2ND: | 96 − 64 = 32 | 32→A | 51 |
| 3RD: | 32 − 64 = −32 | −32 + 320 = 288→A | 52 |
| 4TH: | 288 − 64 = 224 | 224→A | 51 |
| 5TH: | 224 − 64 = 160 | 160→A | 51 |

| Number | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| A in | A | 5/8A | B | 2/8B | 7/8C | D | 4/8D | E | 0 | 5/8F | G | 2/8G | 7/8H | I | 3/8I | J | 0 | 5/8K | L | 2/8L |
| B in | 0 | 3/8B | 0 | 6/8C | 1/8D | 0 | 4/8E | 0 | F | 3/8G | 0 | 6/8H | 1/8I | 0 | 5/8J | 0 | K | 3/8L | 0 | 6/8M |
| M/8 | 0 | 5/8 | 1 | 2/8 | 7/8 | 1 | 4/8 | 1 | 0 | 5/8 | 1 | 2/8 | 7/8 | 1 | 3/8 | 1 | 0 | 5/8 | 1 | 2/8 |
| Next | 0 | 1 | 0 | 1 | 1 | 0 | 1 | 0 | 1 | 1 | 0 | 1 | 1 | 0 | 1 | 0 | 1 | 1 | 0 | 1 |

| Num | 21 | 22 | 23 | 24 | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|---|---|---|---|
| A in | 6/8M | N | 3/8N | 0 | 0 | 5/8P | Q | 1/8Q | 6/8R | S | 3/8S | T | 0 | 4/8U | V | 1/8V | 6/8W | X | 3/8X | 7/8Y |
| B in | 2/8N | 0 | 5/8O | 0 | P | 3/8Q | 0 | 7/8R | 2/8S | 0 | 5/8T | 0 | U | 4/8V | 0 | 7/8W | 2/8X | 0 | 5/8Y | 1/8Z |
| M/8 | 6/8 | 1 | 3/8 | 1 | 0 | 5/8 | 1 | 1/8 | 6/8 | 1 | 3/8 | 1 | 0 | 4/8 | 1 | 1/8 | 6/8 | 1 | 3/8 | 7/8 |
| Next | 1 | 0 | 1 | 0 | 1 | 1 | 0 | 1 | 1 | 0 | 1 | 0 | 1 | 1 | 0 | 1 | 1 | 0 | 1 | 1 |

| Num | 41 | 42 | 43 | 44 | 45 | 46 | 47 | 48 | 49 | 50 | 51 |
|---|---|---|---|---|---|---|---|---|---|---|---|
| A in | Z | 4/8Z | A | 1/8A | 6/8B | C | 2/8C | 7/8D | E | 4/8E | F |
| B in | 0 | 4/8A | 0 | 7/8B | 2/8C | 0 | 6/8D | 7/1E | 0 | 4/8F | 0 |
| M/8 | 1 | 4/8 | 1 | 1/8 | 6/8 | 1 | 2/8 | 7/8 | 1 | 4/8 | 1 |
| Next | 0 | 1 | 0 | 1 | 1 | 0 | 1 | 1 | 0 | 1 | 0 |

FIG. 8

| SET UP: | P/2→Latch A | 100/2=50→A | SELECTION |
|---|---|---|---|
| 1ST: | 50 − 92 = −42 | −42 + 100 = 58→A | 42 |
| 2ND: | 58 − 92 = −34 | −34 + 100 = 66→A | 42 |
| 3RD: | 66 − 92 = −26 | −26 + 100 = 74→A | 42 |
| 4TH: | 74 − 92 = −18 | −18 + 100 = 82→A | 42 |
| 5TH: | 82 − 92 = −10 | −10 + 100 = 90→A | 42 |
| 6TH: | 90 − 92 = −2 | −2 + 100 = 98→A | 42 |
| 7TH: | 98 − 92 = 6 | 6→A | 41 |
| 8TH: | 6 − 92 = −86 | −86 + 100 = 14→A | 42 |

FIG. 9

| Number | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| A in | A | 4/8 A | 6/8 B | C | 1/8C | 3/8 D | 6/8E | F | 0 | 2/8 G | 5/8 H | 1 | 0 | 2/8J | 5/8 K | 7/8L | M | 2/8 M | 4/8 N | 7/8O |
| B in | 0 | 4/8B | 2/8 C | 0 | 7/8 D | 5/8E | 2/8F | 0 | G | 5/8 H | 3/8I | 0 | J | 6/8 K | 3/8L | 1/8 M | 0 | 6/8N | 4/8 O | 1/8P |
| M/8 | 1 | 4/8 | 6/8 | 1 | 1/8 | 3/8 | 6/8 | 1 | 0 | 2/8 | 5/8 | 1 | 0 | 2/8 | 5/8 | 7/8 | 1 | 2/8 | 4/8 | 7/8 |
| Next | 0 | 1 | 1 | 0 | 1 | 1 | 1 | 0 | 1 | 1 | 1 | 0 | 1 | 1 | 1 | 1 | 0 | 1 | 1 | 1 |

| Num | 21 | 22 | 23 | 24 | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|---|---|---|---|
| A in | P | 1/8P | 4/8Q | 6/8R | S | 1/8S | 3/8T | 6/8 U | V | 0 | 3/8W | 5/8X | Y | 0 | 2/8Z | 5/8A | 7/8 B | C | 2/8C | 4/8D |
| B in | 0 | 7/8Q | 4/8R | 2/8S | 0 | 7/8T | 5/8U | 2/8 V | 0 | W | 5/8X | 3/8Y | 0 | Z | 6/8 A | 3/8B | 1/8 C | 0 | 6/8D | 4/8E |
| M/8 | 1 | 1/8 | 4/8 | 6/8 | 1 | 1/8 | 3/8 | 6/8 | 1 | 0 | 3/8 | 5/8 | 1 | 0 | 2/8 | 5/8 | 7/8 | 1 | 2/8 | 4/8 |
| Next | 0 | 1 | 1 | 1 | 0 | 1 | 1 | 1 | 0 | 1 | 1 | 1 | 0 | 1 | 1 | 1 | 1 | 0 | 1 | 1 |

| Number | 41 | 42 |
|---|---|---|
| A in | 7/8 E | F |
| B in | 1/8F | 0 |
| M/8 | 7/8 | 1 |
| Next | 1 | 0 |

IMAGE DISPLAY DATA CONVERSION APPARATUS AND METHOD THEREOF

BACKGROUND OF INVENTION

The present invention relates to, for example, a video interface mechanism when an image is displayed on a display panel. More specifically, the present invention relates to a data conversion method, an apparatus and the like, when enlarging received block data by non-integral multiple.

Generally, display data for displaying an image is processed by a graphics controller of a host apparatus composed of a personal computer (PC) or the like and sent to a display apparatus. Meanwhile, with the advancement of display apparatus represented by a liquid crystal display (LCD) in recent years, a large difference has arisen in throughput between the host apparatus and the display apparatus. For example, in the LCD, higher definition has been achieved for a panel itself, and practical application of a high-definition (super high-definition) panel with a very large resolution has started, including examples such as Quad Extended Graphics Array, QXGA (2048×1536 dots), Quad Super Extended Graphics Array QSXGA (2560×2048 dots), Quad Ultra Extended Graphics Array QUXGA (3200×2400 dots) and so on. However, system power and the power of a graphics controller cannot follow the advancement of the panel. Consequently, it is currently impossible to perform satisfactory display on the super high-definition panel.

For example, with regard to the performance of an image processing system represented by a graphics controller, QXGA is the limit of a typical display function. In the case of 3-dimensional (3D) computer graphics (CG) represented by a home image game machine or the like, throughput is limited to a low resolution of about Video Graphics Array (VGA) (640×480 dots). Thus, for example, while the resolution of the most advanced moving picture is still at the level of VGA, a panel having a resolution several to several tens higher can now be manufactured, bringing about conspicuous differences in the throughput.

As a method for solving the power shortage of such a graphics chip, the applicant has proposed a technology for optimizing the amount of work for the entire system including the graphics chip by distributing processing between a host side, system side, and a panel side, monitor side, as disclosed in Japanese Patent Application No.Hei 11 (1999)-341461. In the application, image data for image development necessary to display the image is transferred from the host side to the panel side in, for example, block unit. At the panel side, the transferred image data composed of, for example, block unit, is developed in a panel memory, and then output to be displayed. Thus, the proposed technology is highly advantageous in that even when the graphics chip of the host side having low throughput is used, the image can be displayed on, for example, a high-definition panel.

As methods for transferring display data, there are, for example, a line transfer method and a block transfer method, represented by a Moving Picture Experts Group (MPEG). In the above-described technology proposed by the applicant, the block transfer method may be mainly employed from now on, considering, for example, applicability to image compression.

As described above, by using the technology proposed by the applicant, it is possible to display the data of various enlargement ratios on the display. In addition, for example, when display data to be displayed is transferred by the block transfer method, and displayed in an enlarged manner on the display, an accurate enlargement can be carried out if the enlargement ratio is an integer, thus causing no problems. However, if the enlargement ratio is not an integer but is a number including decimal places, the use of the block transfer method may not be sufficient. In other words, it is necessary to develop an image on the memory in dot unit finally to display the image. Thus, for a fraction below decimal point, processing must be executed by calculation with for example an adjacent dot, causing a problem to be solved, namely, the necessity of supplying the information of the adjacent dot.

When, for example, data composed of 32 dots×32 dots is transferred to be displayed after being multiplied by 65/64, a fraction is generated between blocks. In such a case, mixing must be carried out between the adjacent blocks, and even when the data composed of 32×32 dots is transmitted, information around the same must be supplied for the enlarged display. Alternatively, displaying must be carried out approximating 32×32 dots. Consequently, the enlargement can be made only by an integral multiple with a distorted shape.

Figure 10:
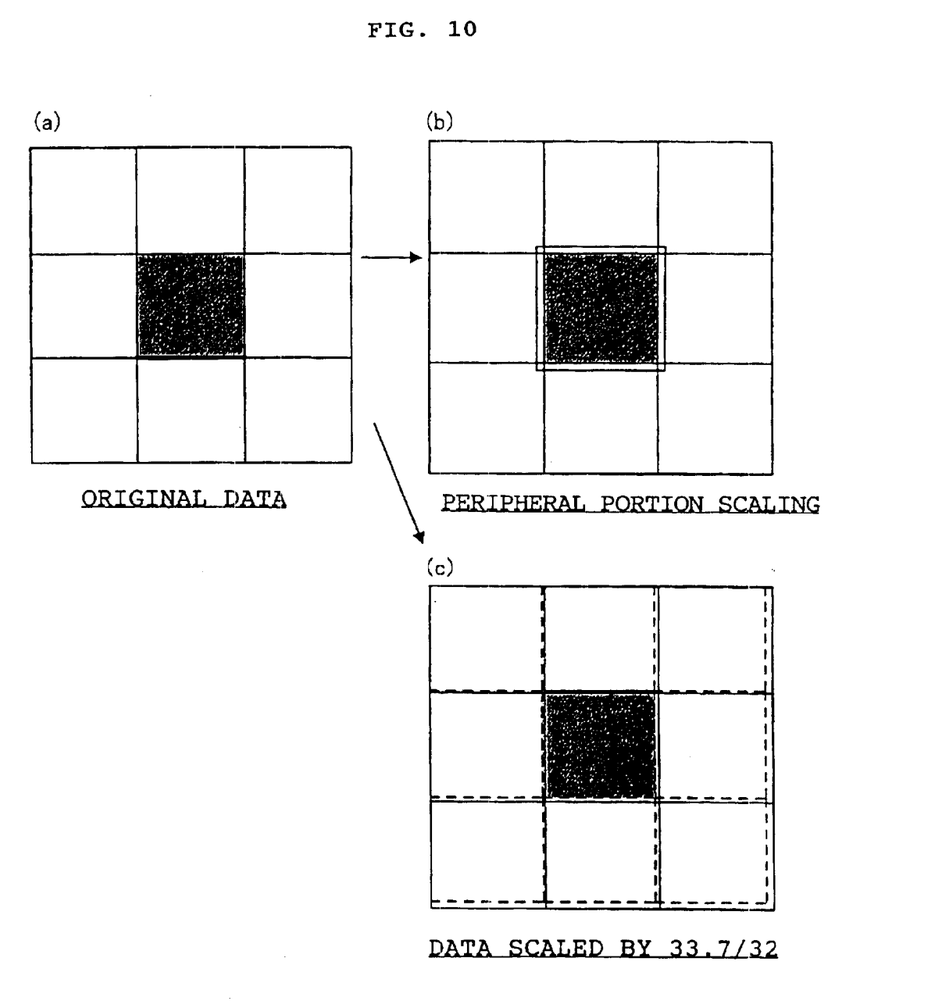
FIGS. 10A to 10C are views illustrating a conventional scaling method.

FIGS. 10A to 10C are views illustrating a conventional scaling method. Here, for example, a case where the original image data (original data) composed of 32 dots×32 dots is enlarged by being multiplied by 33.7/32 is shown. Specifically, FIG. 10A shows the original data 32 dots×32 dots, FIG. 10B shows the former case where mixing is performed between the adjacent blocks and FIG. 10C shows the latter case where the displaying is performed approximating, for example, 32 dots×32 dots.

The original data shown in FIG. 10A moves the block composed of 32 dots×32 dots to a different space. In most cases, a scaling is not an integral multiple whereas the image-displaying configuration of a screen is decided by an integer as a dot.

In the case shown in FIG. 10B, that is, in the case where mixing is performed between the adjacent blocks, when calculation is for example executed involving information of surrounding boundaries, many memories are required, and random transfer cannot be performed. A configuration may be made for transmitting data of a slightly large size. For example, a method may be employed to transmit data at 34 dots×34 dots with respect to 32 dots×32 dots at the transmission side. Here, the added two dots means addition of one dot to each side of rectangular area. In this case, although mixing can be possible between the adjacent blocks, large data must be transmitted in each transfer, causing a lowering of transfer efficiency and an increase in a bandwidth taken from the memory. This situation is not preferable, because an operation at the system side, which supplies the data, becomes difficult.

On the other hand, in the case shown in FIG. 10C, that is, in the case of approximate displaying in 33 dots×33 dots, for example, errors are gradually accumulated. Such an accumulation of errors causes image deviation, and there exists a problem that the error goes beyond a permissible range. Solid lines in FIG. 10C indicate ideal conversion coordinates, and dotted lines indicate the approximate displaying in 33 dots×33 dots. It can be understood that as values of coordinates increase (moving away from a reference point on the upper-left), errors are accumulated. In the conventional display system, the accumulation of errors was not a problem, because the enlargement ratio was related to the entire screen. However, in the case where data of various enlargement ratios can be displayed at the same time, the accumulation of errors becomes a serious problem.

SUMMARY OF INVENTION

The present invention attempts to solve the foregoing technical problems, and an object of the present invention is to enable a processing of partial conversion by magnification without requiring many memories.

In order to achieve the foregoing object, according to the present invention, when data is moved between two spaces having different coordinate axes, for example, blocks of four patterns of enlargement ratios are prepared, and mixed to minimize an error, followed by conversion by magnification. Specifically, the present invention provides a data conversion method for converting original data divided into blocks, each block having a m dot width (m: an integer), into data multiplied by n/m (n: a non-integer). This method is characterized in that a block having a first dot width using one of two continuous integers sandwiching the n and a block having a second dot width using another integer are selected. Then a predetermined block having a m dot width constituting the original data is subjected to a conversion by magnification in accordance with the data having the first or the second dot width. The data converted by magnification having the first dot width and the second dot width, then, are sequentially selected. Considering the horizontal and vertical sides of each block, it can be said that blocks of four patterns of enlargement ratios, namely, first dot width×first dot width, first dot width×second dot width, second dot width×first dot width and second dot width×second dot width, are prepared, then converted by magnification.

Here, the data conversion method is characterized in that the blocks respectively having the first and second dot widths are selected so as to minimize the error, and the data converted by magnification based on the dot width and the enlargement ratio thereof are mixed. This method is preferable, because a fraction is absorbed and processed while the block having the m dot width corresponds to the block having the first dot width or the block having the second dot width during the processing.

In addition, for the selected block, at least one of longitudinal and lateral dots has a first or second dot width. In other words, by similar operations for the vertical and horizontal sides of the block, generation of the error can be suppressed.

Further, the application of the conversion by magnification is not limited to enlargement of the original data, and it can be similarly applied to reduction thereof.

When the present invention is applied to a system composed of a host side which supplies original data and a panel side which displays image data, in addition to the mode for executing the conversion of all data applied in the present invention at a display side, the present invention can be applied to the mode for transferring the data to the display side after the data conversion applied in the present invention is executed at the host side.

The present invention provides a data conversion method in which data composed of blocks from a first coordinate axis system is input, the data undergoes a scaling with respect to a second coordinate axis system which is different from the first coordinate axis system, and the data, then, is input and converted. This method is characterized in that, in the second coordinate system, a plurality of blocks are selected so that an error caused by the scaling performed using only a predetermined block defined by an integer can be absorbed by another block defined by an integer or other blocks defined by integers. The scaling is, then, executed in accordance with the plurality of the selected blocks at the same time, and data contained in the blocks sequentially input from the first coordinate system are sequentially converted in accordance with the plurality of blocks assigned by the scaling.

Here, the scaling is executed by selecting the plurality of blocks consisting of the predetermined block and the other block based on Bresenham's logic and by mixing the selected blocks. The use of Bresenham's logic is effective, for example, when blocks are discretely selected.

Two blocks can be selected as the plurality of blocks; however, the scaling may also be executed based on three or more blocks.

On the other hand, from the viewpoint of image displaying, the present invention provides an image display method for converting image data with a first resolution output from a host side, and displaying the image data on a display with a second resolution. This method is characterized in that, when the image data is input from the host side by a block having a m dot width (m: an integer), and the m dot width is converted by being multiplied by n/m (n: a non-integer) based on a relation between the first resolution and the second resolution, a block having a first dot width using one of two continuous integers sandwiching the n and a block having a second dot width using another integer are selected. The scaling is executed in accordance with the selected blocks respectively having the first and second dot widths. Then, the block input based on the scaling having the m dot width is appropriately converted and displayed. The mixing of the blocks respectively having the first and second dot widths is characterized in that the scaling is performed in the state where generation of a fraction in the longitudinal or lateral side of the second resolution is prevented. By this configuration, for example, in the application which enlarges the image data with the low resolution from the host side and displays the image data with the high resolution on the display, it is possible to solve the problem of transferring extra image data necessary for fraction processing, displaying the image data with accumulated errors retained or the like.

The present invention provides an image processing apparatus for developing original data having a first dot width to one having a second dot width. This image processing apparatus comprises: input means for inputting the original data in block unit, each block having a m dot width; calculation means for calculating, from the first dot width, the second dot width and the m dot width, the number of dots of a block and fractions included when developing to the second dot width; decision means for deciding one block from a block having the foregoing number of dots and a block having the number of interpolation dots for interpolating a fraction, by using Bresenham's logic for example, as the one corresponding to an input block unit based on the calculated fraction; and development means for developing a unit of the input original data according to the block having the decided number of dots or the block having the number of interpolation dots. Here, for example, when n/m=32.5/32, two integral values of 32 and 33 are set. It is possible to consider that, for 32 dots, 33 dots become the number of interpolation dots, and for 33 dots, 32 dots become the number of interpolation dots.

From another viewpoint, the present invention provides an image processing apparatus for developing original data having a P dot width (P: an integer) to one having an R dot width (R: an integer). This image processing apparatus comprises: input means for inputting the original data in block unit, each block having a m dot width; selection means for appropriately selecting a predetermined block having a number of dots, the number being an integral value decided based on R×m/P, or another block having a number of dots, namely, the number of dots+1, for each block unit input by the input means; and conversion means for converting each block of the original data input by the input means according to the selected block or the other block. An enlargement ratio is expressed as R/P, and when multiplied by m, R×m/P may not be an integer. For example, for storing in a memory, development must be performed in dot unit, requiring the processing of a fraction part. By this configuration, through a simple processing, the input original data can be subjected to conversion by magnification without generating a fraction, and developed in the memory.

The present invention provides an image processing apparatus for converting original data divided into blocks, each block having a m dot width (m: an integer), into the one multiplied by n/m (n: a non-integer). This image processing apparatus comprises: block selection means for selecting a block having a first dot width using one of two continuous integers sandwiching the n and a block having a second dot width using another integer; first conversion-by-magnification means for converting by magnification a predetermined block having a m dot width constituting the original data in accordance with data having the first dot width; second conversion-by-magnification means for converting by magnification a block having a m dot width constituting the original data in accordance with data having the second dot width; and selection means for sequentially selecting data having the first dot width converted by magnification and the data having the second dot width converted by magnification.

On the other hand, the present invention provides an image display apparatus. This image display apparatus comprises: a panel for displaying an image; image data receiving means for receiving image data in block unit to be displayed from a host apparatus which executes an application; conversion-by-magnification means for converting by magnification the received image data in block unit in accordance with a block having a first dot width or a block having a second dot width; a panel memory for developing the converted image data; and panel control means for writing the developed, converted image data to the panel.

Here, the image data receiving means receives the image data in block unit, each block having a m dot width, and the conversion-by-magnification means selects an integer portion of the n as a first dot width when the image data is enlarged by being multiplied by n/m (n: a non-integer) and selects a value obtained by adding 1 to the first dot width as a second dot width. Though enlargement ratio varies with blocks, processing can surely be completed in one block unit.

In addition, the image data to be displayed is data having a P dot width and is displayed after being enlarged to an R dot width on the panel, and the n can be expressed as R×m/P.

The conversion-by-magnification means can execute magnification conversion for both horizontal and vertical sides of the image data.

The present invention provides an image display apparatus in which image data with a first resolution output from a host side is subjected to conversion, and then the converted image data is displayed on a display with a second resolution. This image processing apparatus comprises: input means for inputting the image data from the host side in block unit having a m dot width (m: an integer); block selection means for selecting a block having a first dot width using one of two continuous integers sandwiching the n or a block having a second dot width using another integer, when the m dot width is converted to a width multiplied by n/m (n: a non-integer) based on a relation between the first resolution and the second resolution; scaling means for executing a scaling in accordance with the selected blocks respectively having the first and second dot widths at the same time; and display means for appropriately converting and displaying the input block having the m dot width based on the executed scaling.

In an image display system of the present invention, the problem, which has conventionally occurred upon transferring image data, is solved by optimizing the amount of work for the entire system by distributing processing between a host apparatus and a panel side. Specifically, this image display system comprises: a host for executing application and transmitting image data having a P dot width in block unit, each block having a width composed of m dots; and a display connected to the host which converts, by magnification, the image data having the P dot width to the one having an R dot width and displays the image data. This display includes: scaling means for executing a scaling by using a block having a dot width of an integral value obtained by R×m/P and a block having a dot width of a second integral value obtained by adding 1 to the integral value; and conversion means for converting by magnification the image data received from the host in block unit based on the executed scaling.

Here, the scaling means executes the scaling by using the block having the dot width of the integral value and the block having the dot width of the added integral value when a value obtained by R×m/P includes a fraction, and processes an error by using the blocks respectively having the dot width of the integral value and the dot width of the added integral value at the same time. In this way, the throughput of the image display system including image data transfer capability can be sufficiently utilized.

On the other hand, the present invention provides an image processing system. This image processing system comprises: a transmitting apparatus for transmitting a generated original data having a P dot width in block unit, each block having a width composed of m dots; and an image processing apparatus for receiving the original data from the transmitting apparatus, converting, by magnification, the original data having the P dot width to the one having an R dot width, and storing the data. The image processing apparatus includes: scaling means for executing a scaling to the R dot width so as to eliminate an error due to a fraction, by using a block having a dot width of an integral value and a block having a dot width of an added integral value obtained by adding 1 to the above integral value, when a value obtained by R×m/P is a non-integral value including a fraction; conversion means for converting by magnification the original data received from the transmitting apparatus in block unit in accordance with a corresponding block based on the executed scaling; and storing means for storing the converted data converted by the conversion means in a memory.

Here, the transmitting apparatus may include, for example, a scanner for reading and outputting an image. The image processing apparatus may simply be the one for storing the image in the memory.

BRIEF DESCRIPTION OF DRAWINGS

For a more complete understanding of the present invention and the advantages thereof, reference is now made to the following description taken in conjunction with the accompanying drawings.

DETAILED DESCRIPTION

First, description will be made in relation to a scaling method according to an embodiment of the present invention, prior to the detailed description of the configurations of a system of the embodiment.

Figure 1:
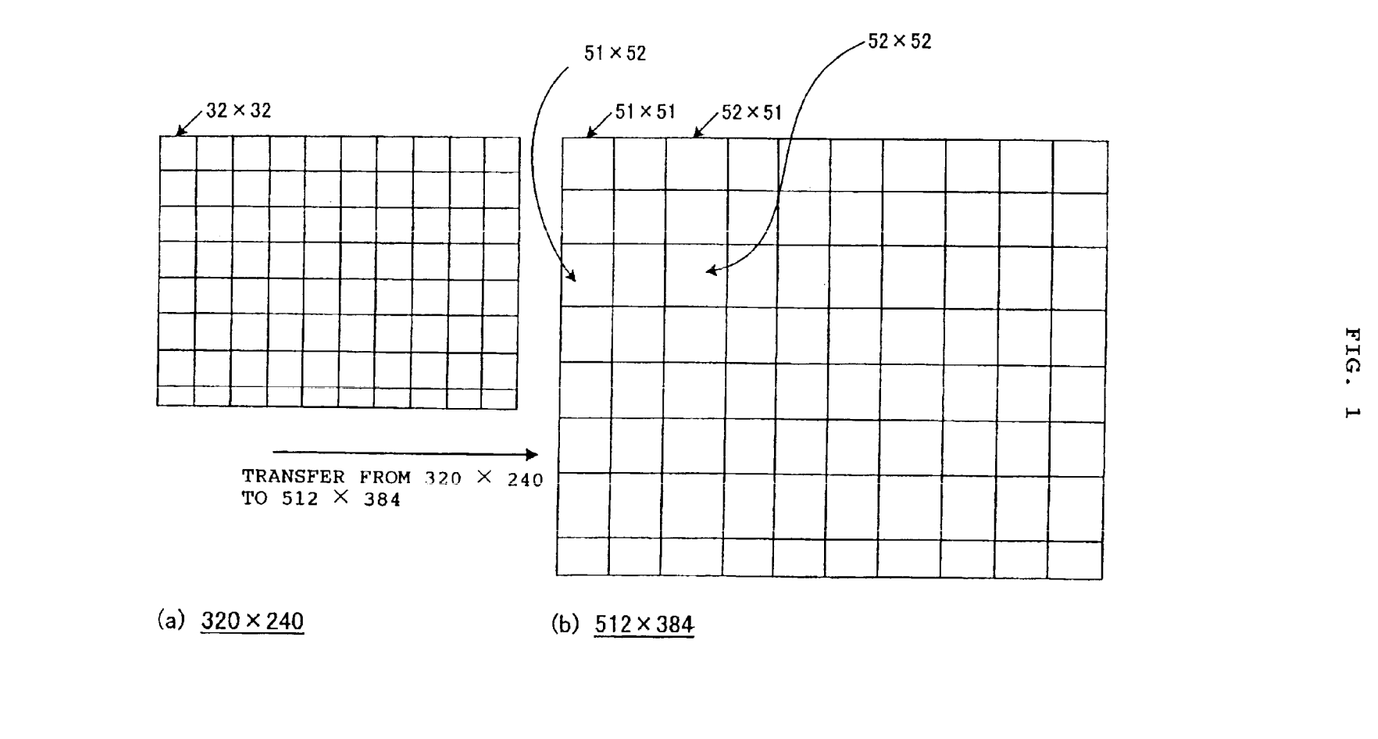
FIGS. 1A and 1B are schematic views showing a scaling method according to an embodiment of the present invention.

FIGS. 1A and 1B schematically illustrate the scaling method of the embodiment. Specifically, FIG. 1A shows the scaling of original data to be transferred from a transmitting apparatus such as a host apparatus or the like, and FIG. 1B shows a state of the original data developed in the memory of an image processing apparatus such as a display side or the like. Here, a case where the original data composed of 320 dots×240 dots is converted to the one composed of 512 dots×384 dots is shown. As shown in FIG. 1A, the original data is divided into blocks composed of 32 dots×32 dots. Here, an enlargement ratio is 1.6(512/320=1.6, 384/240=1.6), thus 32×1.6=512, and the block composed of 32 dots×32 dots cannot be converted without a remainder. If the scaling is performed with 51 dots×51 dots, a shortage of 2 dots occurs in an enlarged, full scale. In addition, if an accurate scaling is attempted based on the enlargement ratio of 1.6, a perplexing control of a boundary portion is required.

Thus, according to the embodiment, as shown in FIG. 1B, blocks having four patterns of enlargement ratio, namely, 51 dots×51 dots, 52 dots×52 dots, 51 dots×52 dots and 52 dots×51 dots, are used at the same time to fit in a window, allowing an application to the window of a predetermined size without any remainders. In other words, blocks of a plurality of enlargement ratios are prepared, and these blocks are mixed so as to minimize an error and displayed. Thus, by processing the boundary of a fraction as an integer, conversion by magnification can be performed without any accumulation of errors while a coordinate of a transfer destination is an integer. Here, the selection of a 51 dot width and a 52 dot width is made to agree with target numbers, by using, for example, Bresenham's method or the like. Bresenham's method is the one for drawing a straight line only by operating integers, and is effective in selecting discrete dots on the screen. Such scaling methods in the embodiment are referred to as a "double scaling", hereinafter.

Next, description will be made in relation to a system configuration for executing the double scaling according to the embodiment. An image display system is used as a representative example of the description. However, the embodiment is not necessarily limited to such image display system, and it can be applied to a system between other hardware units or between software units.

Figure 2:
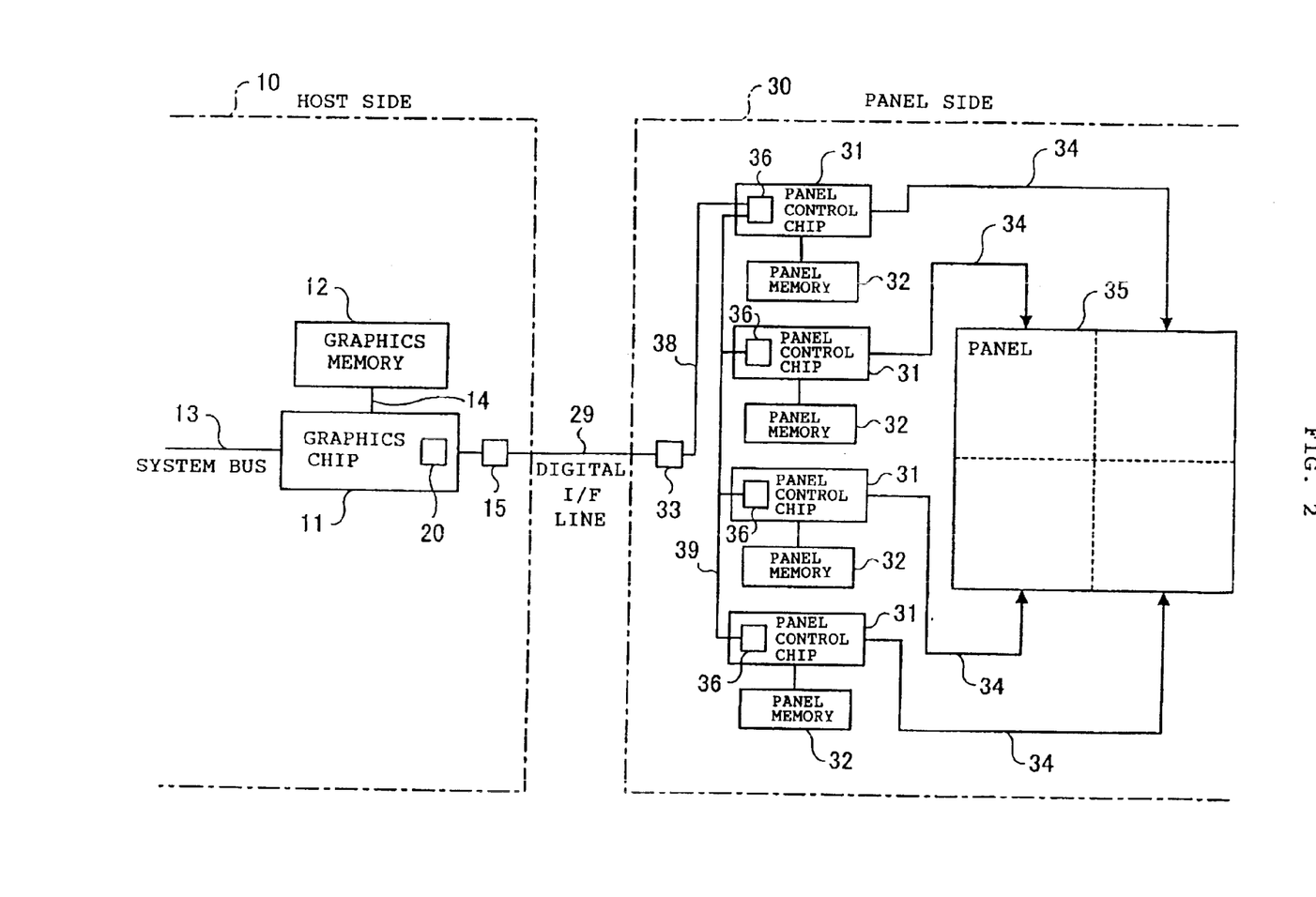
FIG. 2 is a block diagram showing an image display system of the embodiment according to the present invention.

FIG. 2 is a block diagram showing the image display system of the embodiment. As shown in FIG. 2, in the image display system of the embodiment, image data (video data) divided into blocks is transmitted from a host (HOST) side 10 composed of a personal computer (PC) or the like through a digital I/F line 29 to a panel side 30. The host side 10 functions as a driving apparatus for driving the image display apparatus of the embodiment, and the panel side 30 has a role to develop and display the transmitted image data.

At the host side 10, processing for the image data to be transferred is executed to a graphics chip 11 by a preprocessor 20 provided therein. A graphics memory 12 stores, for example, the image data in block unit. The graphics memory 12 is constructed to have a smaller capacity compared with that of the conventional one, because distribution of processing eliminates the necessity of continuous refreshing of the graphics chip 11. A system bus 13 connects a host system (not shown), which executes an application, to the graphics chip 11. A graphics memory bus 14 is located between the graphics chip 11 and the graphics memory 12, and used for, for example, exchanging the image data. In addition, an interface (I/F) transceiver 15 functions to serialize the image data, and then transmits the image data through a digital I/F line 29 to the panel side 30.

On the other hand, the panel side 30 includes a plurality of panel control chips 31 having post processors 36 provided therein. In FIG. 2, corresponding to a panel 35 divided into four areas, four panel control chips 31 are used to drive the divided panel 35. A panel memory 32 is provided in each panel control chip 31 to develop the image data to be displayed on the panel 35. An interface (I/F) receiver 33 inputs the image data from the host side 10 through the digital I/F line 29. A panel data output 34 transmits an output from the panel control chip 31 to the panel 35. The panel 35 is composed of, for example a liquid crystal display (LCD), and is divided into four areas as shown in FIG. 2. The panel 35 is composed of a high-definition panel. To support such a high-definition screen, a plurality of parallel processing can be executed by the panel control chips 31. In addition, an external data bus 38 supplies the image data input to the IF receiver 33 to each panel control chip 31 via the post processors 36. An in-panel data bus 39 transfers the video data, job number or the like.

The image display system shown in FIG. 2 is characterized in that the data is subjected to preprocessing by the preprocessor 20 provided in the graphics chip 11, and then subjected to post processing by the post processors 36 provided in the panel control chips 31. Accordingly, all the screen generation jobs including image data mixing, screen refreshing and the like, performed thus far by the graphics chip 11 of the host side 10, are moved to the display apparatus side (panel side 30). That is, at the preprocessor 20, a tag, attributes of the image data and an error protection are added before developing the image data that is, before mixing the image data. At the post processors 36, the image data is developed for the first time in the panel memory 32. In other words, the image data is uncompressed, mixed and transferred to a refreshing circuit (not shown).

Description will be made in relation to the general flow of image data processing according to the embodiment.

The graphics chip 11 of the host side 10 reads/writes the graphics memory 12 by using the graphics memory bus 14. For an application system (not shown) for executing the application, handling is performed by the system bus 13. For this system bus 13, for example, Accelerated Graphics Port (AGP) is employed. This AGP has a performance higher by two to eight times than that of the conventional Peripheral Component Interconnect Bus (PCI bus). However, not being a bus only one becomes active in the system. The digital output of the graphics chip 11 is sent to the I/F transceiver 15, serialized therein, and then transferred at a high speed.

The image data serialized by the I/F transceiver 15 is sent through the digital I/F line 29 to the I/F receiver 33 of the receiving side. This I/F receiver 33 returns the serialized image data back to the original parallel video data. This converted parallel image data is sent to the panel control chips 31. In each panel control chip 31, first, the image data in packet is uncompressed by the post processor 36, data operation is performed in accordance with the recognized window ID, and the data is developed and stored in the panel memory 32. Aside from this operation, the panel control chip 31 sequentially reads the display data from the panel memory 32, and sends the data to the panel 35.

As described above, according to the embodiment, most of display processing jobs conventionally performed by the graphics chip 11 (for example, image data development, refreshing the data for displaying, timing generation in a direction of H (horizontal)/V (vertical), memory allocation based on the screen size of the display apparatus, allocation of the number of colors and the like) are executed by the post processor 36 of the panel control chip 31 and a subsequent circuit. Accordingly, the system of the embodiment can function sufficiently to reduce a load placed on the graphics chip 11 of the host side 10, and to perform a high-definition displaying so that the display processing can be executed in the panel control chip 31 which allows a multi-chip configuration. Moreover, in the graphics chip 11, processing is executed simply with, for example, a VGA resolution, and enlargement processing is executed in the panel control chip 31. Thus, it is possible to display moving pictures such as 3D graphics.

Next, detailed description will be made in relation to a configuration for executing double scaling, which is one of the features of the embodiment.

Figure 3:
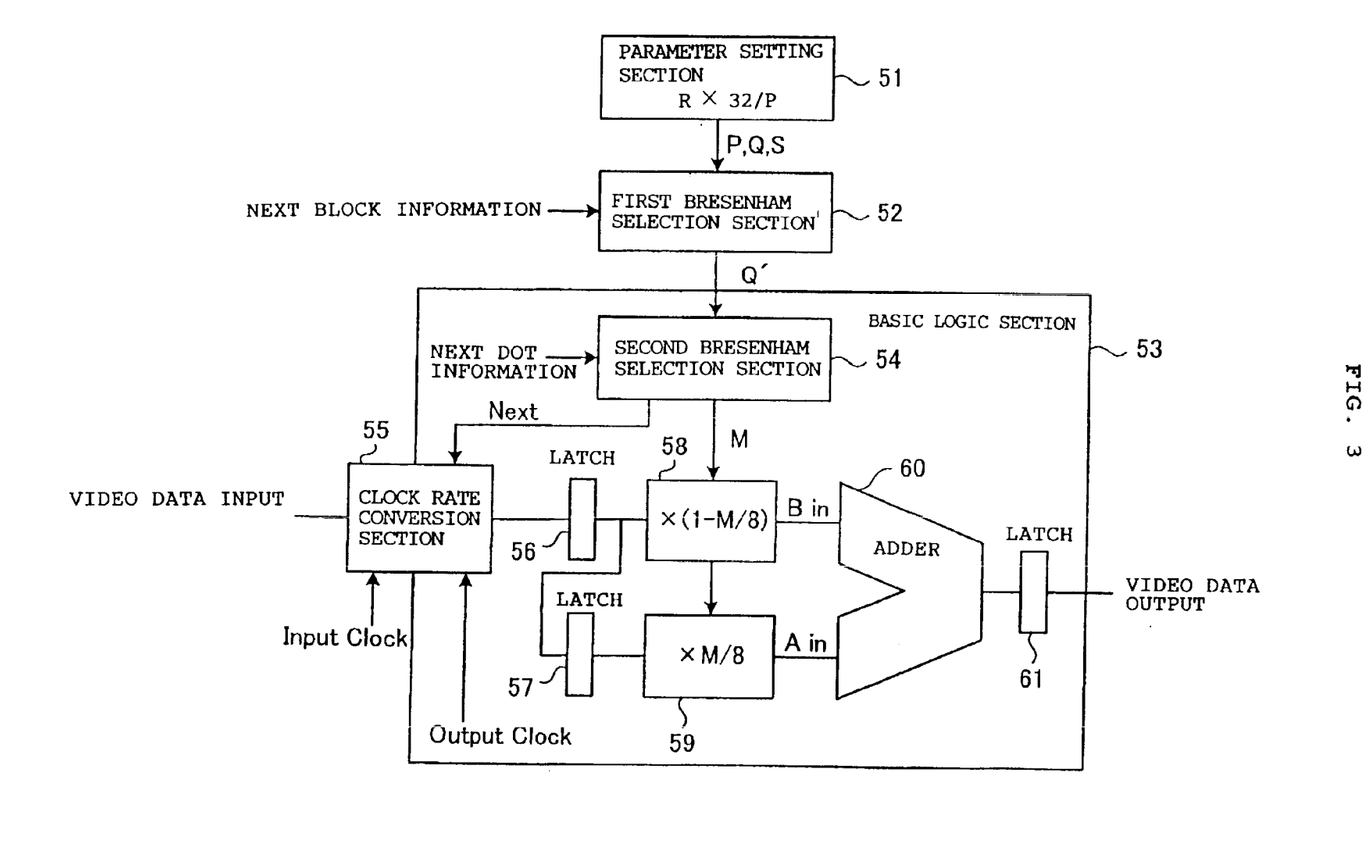
FIG. 3 is a block diagram showing a function for executing a double scaling.

FIG. 3 is a block diagram showing a function for executing double scaling. Specifically, a function executed by the panel control chip 31 of the panel side 30 is shown. Here, roughly speaking, a parameter setting section 51, a first Bresenham selection section 52 and a basic logic section 53 are provided. As an example, the case of enlarging the data having a horizontal width composed of a P dot to the one having a horizontal width composed of an R dot is described. An operation is similar for a vertical side and, thus, only an operation for the horizontal side is described.

At the parameter setting section 51, as a m dot width, calculation is first performed to determine what dots of a block are to be obtained when the block of 32 dots is enlarged. This value can be provided in advance as a constant if an enlargement ratio is already determined. Here, assuming that the number of dots of the enlarged block is Q and a fraction is S, since the enlargement ratio is expressed as R/P, Q and S can be obtained by an equation:

$$R \times 32 = Q \times P + S$$

Information regarding the horizontal width composed of the P dot of the original data supplied to the parameter setting section 51 can be contained, for example, in packet when block transfer is performed. In addition, the information can be recognized beforehand at the panel side 30.

Then, at the first Bresenham selection section 52, whether the number of dots for a subblock becomes Q or Q+1 is decided, and Q" (Q+1 or Q) is output. Based on this decided information, an addition rate M for each dot is calculated at the basic logic section 53, and 32 dots are enlarged to Q or Q+1 dots while adjacent two dots are operated based on the calculated value. For the enlargement ratio of a next subblock, the process returns to the first Bresenham selection section 52, where Q or Q+1 is calculated, and similar enlargement processing is executed. To calculate enlargement from the 320 dots to 512 dots, each parameter becomes as follows:

$$R=512, P=320$$

$$Q=\text{integer } (512 \times 32/320)=51$$

$$S=512 \times 32 - 320 \times 51 = 64$$

Next, the basic logic section 53 will be described in detail. At a second Bresenham selection section 54 of this basic logic section 53, an addition rate M for each dot is calculated based on information from the first Bresenham selection section 52. From the second Bresenham selection section 54, a data fetch timing signal Next (negative logic of polarity bit) is output to a clock rate conversion section 55. At the clock rate conversion section 55, an input clock (Input Clock) and an output clock (Output Clock) are input, and the data from a video data input is loaded in accordance with the fetch timing signal Next. An output from the clock rate conversion section 55 is latched by latches 56 and 57 for operation of adjacent data. Then, based on the addition rate M calculated at the second Bresenham selection section 54, nine patterns of magnifications, such as, 0, ⅛, २⁄₈, ⅜, ⅘, ⅝, ⅞, ⅞, and 1 are selected by multiplication sections 58 and 59. The output of a magnification selected by one of the multiplication sections 58 and 59, and the output of an adjacent magnification are added by an adder 60 and output as the video data output after a timing is set by the latch 61.

Figure 4:
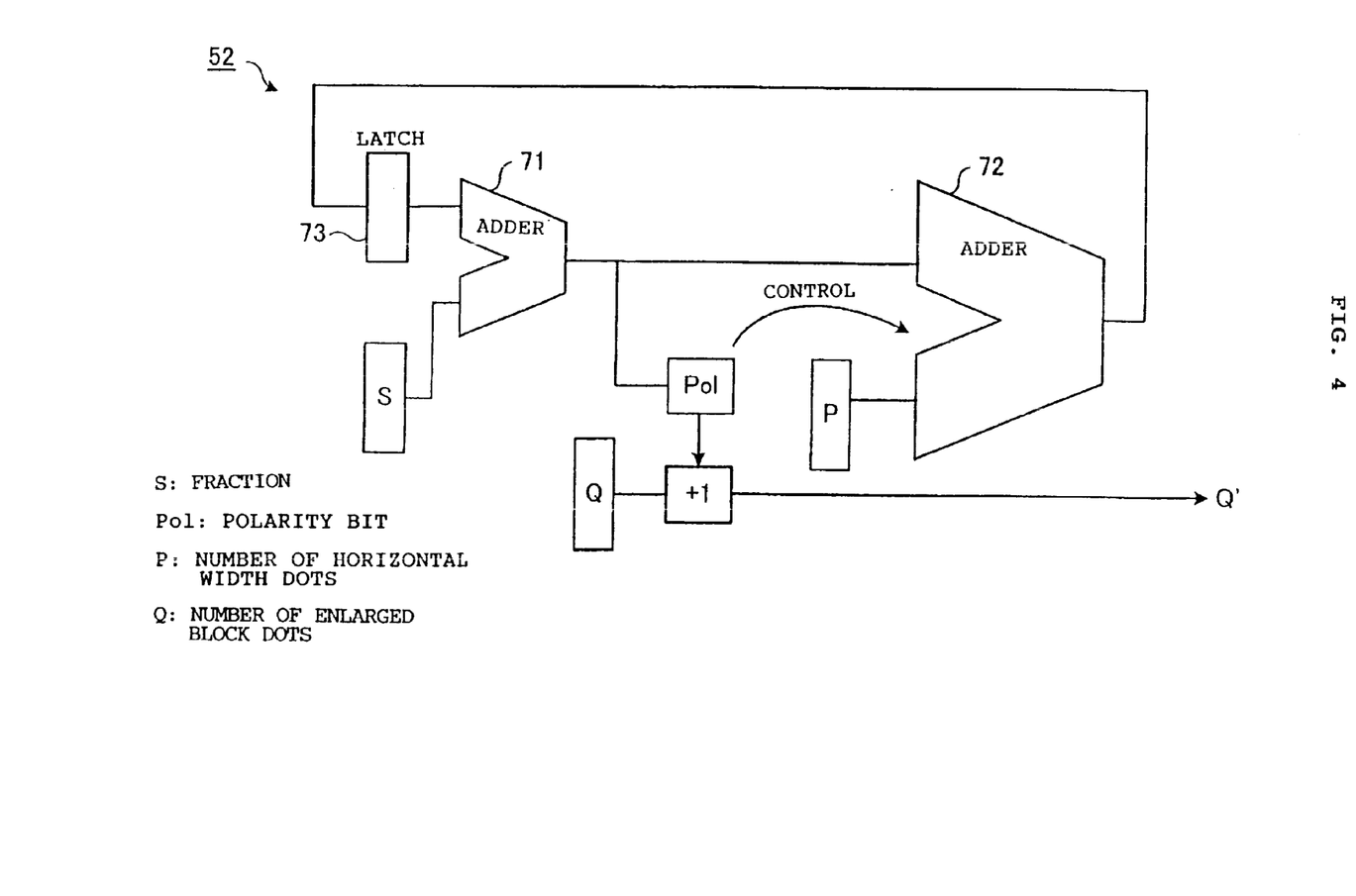
FIG. 4 is a block diagram showing a configuration of a first Bresenham selection section 52.

FIG. 4 is a block diagram showing a configuration of the first Bresenham selection section 52. This first Bresenham selection section 52 includes a two-stage adder, namely, adders 71 and 72, and a latch 73. A fraction S is input to the first adder 71, and based on the code of the addition result from the first adder 71, whether an addition by the second adder 72 is executed or not is decided. Based on a polarity bit (Pol), whether +1 is performed or not to the number of dots of an enlarged block Q is decided, and the result is output as Q' (Q+1 or Q). In addition, the polarity bit (Pol) is also used in deciding as to whether an addition by the second adder 72 is executed or not. The second adder 72 adds P, the number of the horizontal dot width, and the addition result from the first adder 71, then outputs the result to a latch 73. This output is input to the first adder 71 after a timing is set by the latch 73.

Processing executed at the first Bresenham selection section 52 is a method designed for performing an operation by using an integer. For example, if an enlargement ratio (n/m) with regard to 32 dots is 1.6, then the result is 51.2 dots, in other words, n/m=51.2/32. When 51 dots are continued five times, a fraction 0.2 is added to be 1, and 52 dots are selected here. If the selection of 52 dots is executed only by the addition of an integer, Bresenham's logic similar to that of the first Bresenham selection section 52 is used. In the actual calculation, the results obtained by multiplying 0.2 and 1 by 320 are used in order to calculate by using an integer. Thus, remainders 64 result from 0.2×320, and 320 result from 1×320 for one dot. The addition of 0.2 becomes equal to the addition of 64, in other words, the processing equals to subtraction of 320 (64×5 times) to recover the addition result of 1(0.2×5 times).

Figure 5:
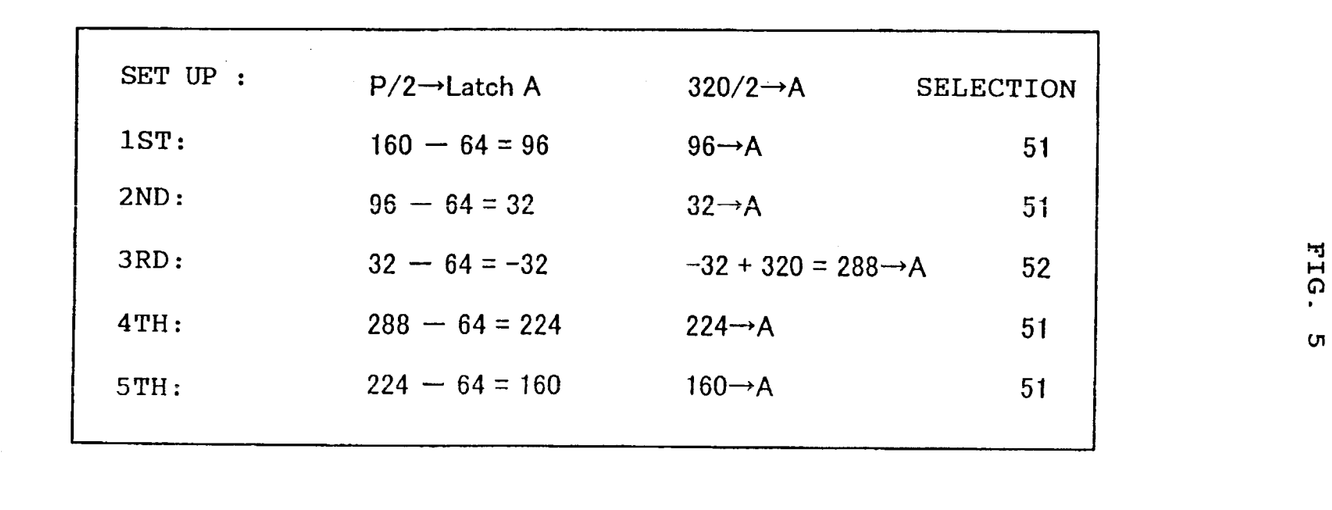
FIG. 5 is a view showing calculation executed at the first Bresenham selection section 52 when an enlargement is performed from 320 dots to 512 dots.

FIG. 5 shows calculations executed at the first Bresenham selection section 52 when the above-mentioned enlargement is made from 320 dots to 512 dots. Here, the latch 73 is indicated as a latch A, and a selection of either 51 or 52 based on the calculation is shown. P/2 is stored in the latch A (latch 73) at the time of set up, in order to output the result of addition in the state of deviation in terms of a straight line, in other words, in the state symmetrical in left and right with respect to the center. As shown in FIG. 5, 51 is selected when the first addition result is positive; and 52 when negative. Based on this value, the value of addition upon enlargement is calculated at the second Bresenham selection section 54 as a next block.

Figure 6:
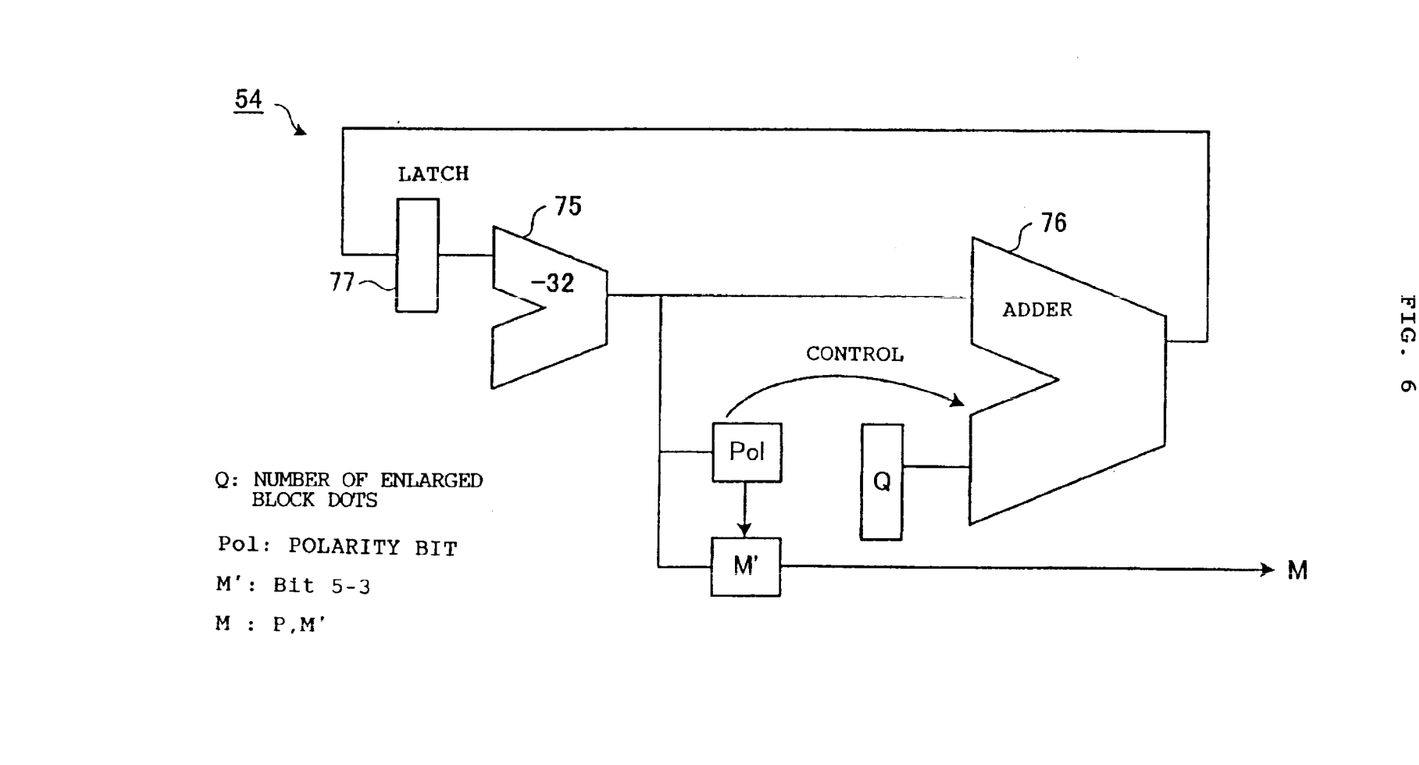
FIG. 6 is a block diagram showing a configuration of a second Bresenham selection section 54.

FIG. 6 is a block diagram showing a configuration of the second Bresenham selection section 54. This second Bresenham selection section 54 includes a two-stage adder 75 and 76, and a latch 77. Since conversion is made from the block composed of 32 dots here, the first adder 75 is fixed at 32 dots, and outputs data by subtracting 32 from the output of the latch 77. In addition, based on a polarity bit (Pol), M' (bit 5-3 of the adder 75 as an actual dot addition rate) is provided. Further, the adder 76 is controlled by this polarity bit (Pol). The number of enlarged block dots Q and an output from the adder 75 are added to the adder 76, and the result of addition is stored in the latch 77.

According to the embodiment, the enlargement technique is described by mixing bilinear and simple methods. The bilinear system is for performing multiplication followed by additions. For example, when original data is composed of ABCDEF and multiplied by 1.6, all dots are multiplied by 1.6 and sequentially added. Thus, after the processing, the first dot becomes "A"; the second dot "0.6A+0.4B"; the third dot "B"; the fourth dot "0.2B+0.8C", and so on, in order. In this case, the amount of the logic increases as this method involves multiplier calculations. Also, in the simple method, the operation results of the bilinear method are half-adjusted. Specifically, the results are, in order, "A," "A," "B," "C" and so on. However, these results are too rough. Therefore, in the enlargement method employed in the embodiment, addition is performed slightly finer and carried out at every ⅛. By using ⅛, multiplication by 1.6 is 8×1.6=12.8, and a selection is made from either one of ¹²⁄₈=1.5 or ¹³⁄₈=1.625. The selection of 12 or 13 is operated by Bresenham's method, and the bit 5-3 of the adder 75 represents the actual dot addition rate. Thus, its value and a code are output as M' to the next process, which is the adder 76.

Figure 7:
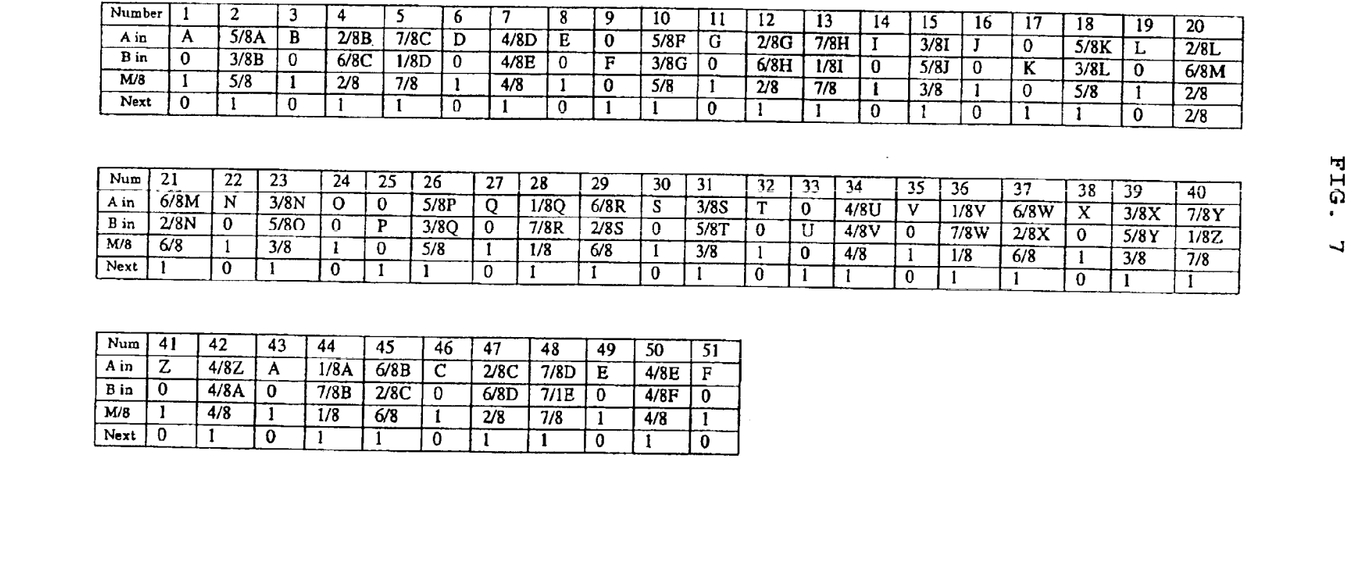
FIG. 7 is a table showing a value of an addition rate M and a value of each dot input to an adder 76 when an enlargement is performed from 32 dots to 53 dots.

FIG. 7 is a table showing the value of the addition rate M and the value of each dot input to the adder 76 when 32 dots composed of ABCDEFGHIJKLMNOPQRSTUVWXYZ-ABCDEF are enlarged to 51 dots. Number in the table denotes the order of enlarged dots, and Ain and Bin respectively denote input values to an adder 60 shown in FIG. 3. M/8 is a value ⅛ of the addition rate M, and Next is a fetch timing signal output from the second Bresenham selection section 54. Here, the result of the calculation, that is, the enlarged first dot is A, second dot is 5/8A+3?8B and so on, is shown up to the 51 st dot in order. Similarly to the first Bresenham selection section 52, the second adder 72 is operated based on the code of a result from the first adder 71. The addition rate M is then sequentially output and the operation is carried out for each actual dot at the last stage based on the output result.

In the table shown in FIG. 7, linear interpolation is carried out for three bits, and simple interpolation for the remaining bits. Thus, each dot for an input is selected from nine patterns of magnifications, namely, 0, ⅛, ²⁄₈, ⅜, ⁴⁄₈, ⅝, ⁶⁄₈, ⅞ and 1, and added to the output of the adjacent dot from magnifications, namely, 1, ⅞, ⁶⁄₈, ⅝, ⁴⁄₈, ⅜, ²⁄₈, ⅛, and 0. The extension of 32 dots to the ones multiplied by 1.6 is executed at the clock rate conversion section 55, the fetch timing signal Next is output from the second Bresenham selection section 54, and data is loaded, matching with the output. The described enlargement is shown as a mixture of the three bit linear interpolation and the simple interpolation; however, a similar result is obtained by other methods.

Figure 8:
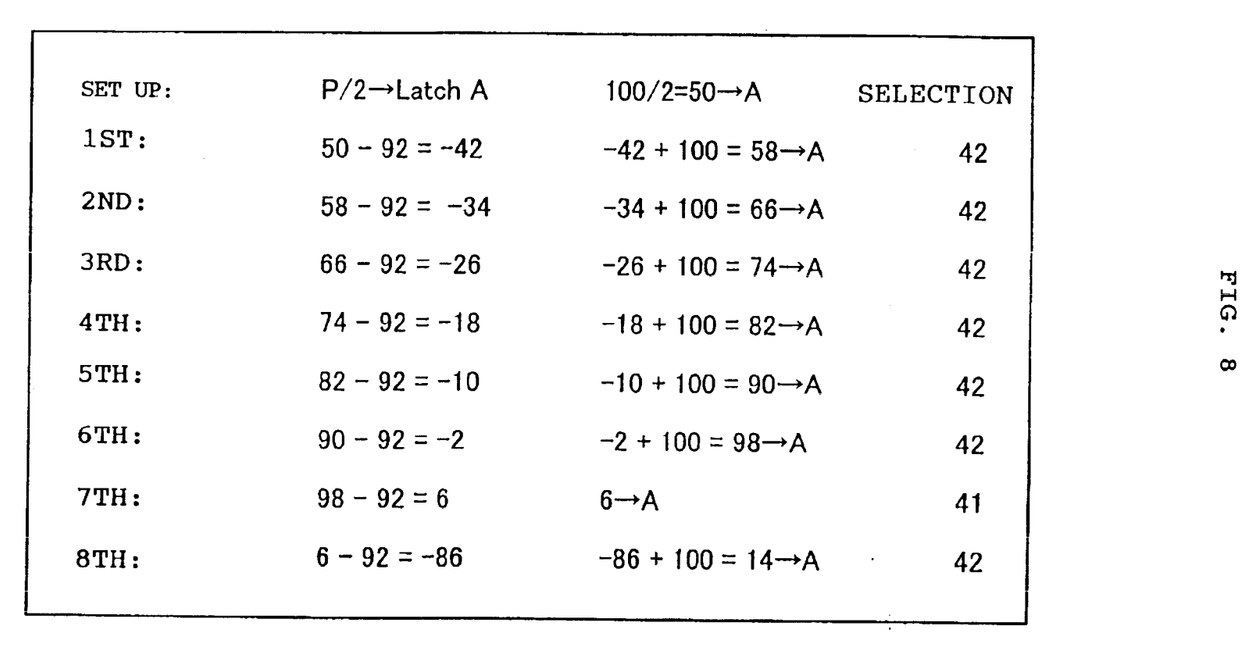
FIG. 8 is a view showing calculation executed at the first Bresenham selection section 52 when an enlargement is performed from 100 dots to 131 dots.

Next, description will be made in relation to the other case of enlargement, specifically, enlargement from 100 dots to 131 dots. In this case, parameters set at the parameter setting section 51 are as follows:

$R=131, P=100$ $Q=\text{integer }(131 \times 32/100)=41$ $S=131 \times 32-100 \times 41=92$ FIG. 8 shows calculations executed at the first Bresenham selection section 52 when enlarging 100 dots to 131 dots. Similarly to the case illustrated in FIG. 5, first, P/2, namely, 100/2, is stored in the latch 73. When the addition result at the first Bresenham selection section 52 is negative, 42 is selected, and 41 is selected when the result is positive. Based on these values, an addition value upon enlargement is calculated by next block, namely, the second Bresenham selection section 54.

Figure 9:
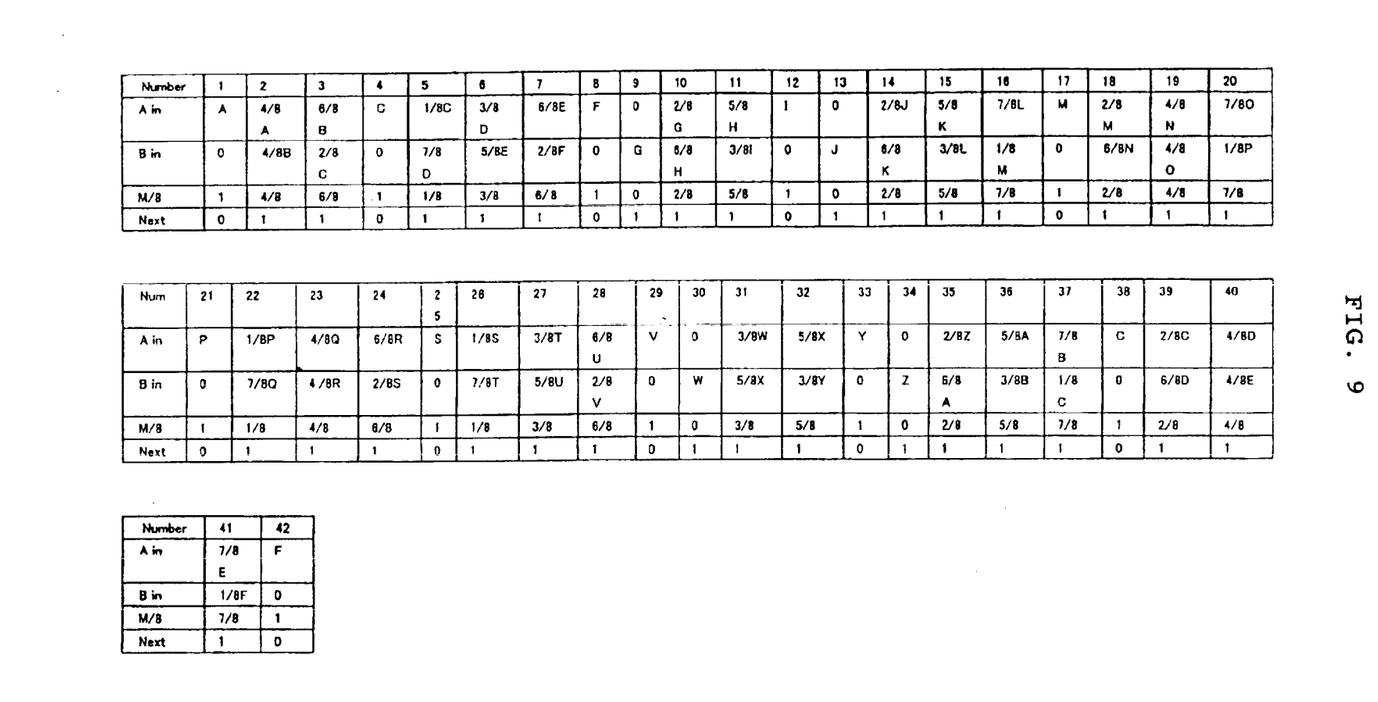
FIG. 9 is a table showing a value of an addition rate M and a value of each dot input to the adder 76 when Q"=42.

FIG. 9 is a table showing the value of an addition rate M and the value of each dot input to the adder 76 when Q'=42. Each item in the table is similar to that shown in FIG. 7. Here, when 32 dots composed of ABCDEFGHIJKLM-NOPQRSTUVWXYZABCDEF are enlarged to 42 dots, the enlarged first dot becomes A; the second dot 4/8A+4/8B, the third dot 6/8B+2/8C. The results of the calculation up to 42nd dot are shown. In this way, the calculation is executed for the addition rate M and the dots. Processing thereafter is executed similarly to that described above in the case where the enlargement is made from 320 dots to 512 dots.

As described above, according to the embodiment, when data is moved between two spaces having different coordinate axes, the two-stage scaling is performed to simplify the error processing. For example, when the block composed of 32 dots×32 dots is to be enlarged to be n/m=32.5/32, blocks of four patterns of enlargement ratio, namely, 32 dots×32 dots, 33 dots × 32 dots, 32 dots × 33 dots, and 33 dots×33 dots, are prepared, and these blocks are mixed and developed so as to minimize the error. In other words, at the first stage, two kinds of scale values are decided for a block boundary, and at the second stage, these scale values are distributed to eliminate the error. 32 and 33 employed here are two continuous integers sandwiching a value of 32.5. By this configuration, image processing in spaces different from each other in resolutions can be smoothly performed. Moreover, when the present invention is applied to the image display system, for example, the accumulation of errors, which pose a serious problem, can be dealt with even when the data of various enlargement ratios are mixed and displayed.

The embodiment has been described mainly based on its application to the image display system. However, as described above, the embodiment is not limited to displaying on the display, and it can be applied to other hardware and even to software. For example, the original data read by the scanner is transferred in block unit to the image processing apparatus, and at this image processing apparatus, the original data is stored in the memory by using the double scaling system of the embodiment.

As described above, according to the present invention, it is possible to perform a partial conversion-by-magnification processing without requiring many memories.

What is claimed is:

1. A data conversion method for converting original data divided into blocks, each block having a m dot width (m: an integer), into data multiplied by n/m (n: a non-integer), comprising the steps of:

selecting a block having a first dot width and a block having a second dot widths, wherein said step of selecting the blocks are selected by using Bresenham's logic;

converting, by magnification, a block having the m dot width constituting the original data in accordance with data having the first dot width;

converting, by magnification, a block having the m dot width constituting the original data in accordance with data having the second dot width; and sequentially selecting data having the first dot width, obtained by conversion by magnification, and data having the second dot width, obtained by conversion by magnification.

2. A data conversion method according to claim 1, further comprises the step of selecting the block having the first dot width and the block having the second width are selected so as to minimize an error, and the data obtained by conversion by magnification based on the dot width of the selection and the magnification thereof are mixed.

3. A data conversion method according to claim 1, further comprises the step of selecting blocks having at least one longitudinal and lateral dot within the first and the second dot width.

4. A data conversion method for receiving input data composed of blocks from a first coordinate system, and converting the input data by executing a scaling to a second coordinate system different from the first coordinate system, comprising the steps of, in the second coordinate system:

selecting a plurality of blocks in order to be absorbed, by at least one additional block defined by an integer wherein an error caused by the scaling uses only a predetermined block having an integer;

executing the scaling in accordance with the selected plurality of blocks; and sequentially converting the data contained in the blocks sequentially input from the first coordinate system in accordance with the plurality of blocks used by the executing scaling step, wherein said step of selecting the plurality of blocks further comprising the step of using the predetermined block and the at least one additional block the predetermined block and the at least one additional block are selected by using Bresenham's logic, and the scaling is executed in a state in which the selected predetermined block and at least one additional block are mixed.

5. An image display method for converting image data with a first resolution output from a host side and displaying the image data on a display with a second resolution, comprising the steps of:

inputting the image data from the host side in block unit, each block having a m dot width (m: an integer);

selecting a block having a first dot width and a block having a second dot width when the m dot width is converted into a dot width multiplied by n/m (n: a non-integer) based on a relation between the first resolution and the second resolution, wherein said step of selecting the blocks are selected by using Bresenham's logic;

executing a scaling in accordance with the selected blocks respectively having the first and second dot widths in a mixed manner; and converting the input block having the m dot width based on the executed scaling and displaying the image.

6. An image display method according to claim 5, further comprising the step of executing the scaling in a state where the blocks respectively having the first and second dot widths are mixed without generating fractions for longitudinal and lateral sides of the second resolution.

7. An image processing apparatus for developing original data having a first dot width to data having a second dot width, comprising:

an input for inputting the original data in block unit, each block having a m dot width (m: an integer);

a calculator for calculating, from the first dot width, the second dot width and the m dot width, the number of dots of a block and fractions included when the original data is developed to the data having the second dot width;

a decision device for deciding which blocks having the number of dots and these blocks having the number of interpolation dots for interpolating the fractions, as a block corresponding to an input block unit based on the fractions calculated by the calculator, wherein the decision device uses Bresenham's logic; and a developer for developing a unit of the input original data in accordance with one decided by the decision device from the block having the number of dots decided by the decision device and the block having the number of interpolation dots.

8. An image processing apparatus for developing original data having a P dot width (P: an integer) to data having an R dot width (R: an integer), comprising:

an input for inputting the original data in block unit, each block having a m dot width (m: an integer);

a selector for selecting a predetermined block having a number of dots of an integral value decided based on R×m/P, wherein the selector selects the block by using Bresenham's logic; and a converter for converting each block of the original data input, in accordance the selector.

9. An image processing apparatus for converting original data divided into blocks, each block having a m dot width (m: an integer), into data multiplied by n/m (n: a non-integer), comprising:

a block selecting device for selecting a block having a first dot width using one of two continuous integers sandwiching the n and a block having a second dot width using another integer;

a first conversion-by-magnification device for converting by magnification a block having a m dot width constituting the original data in accordance with data having the first dot width;

a second conversion-by-magnification device for converting by magnification a block having a m dot width constituting the original data in accordance with data having the second dot width; and a selector for sequentially selecting data having the first dot width obtained by conversion by magnification by the first conversion-by-magnification device and data having the second dot width obtained by conversion by magnification by the second conversion-by-magnification device, wherein the selector selects the data by using Bresenham's logic.

10. An image display apparatus, comprising:

a panel for displaying an image;

an image data receiving device for receiving image data to be displayed in block unit from a host apparatus which executes an application;

a conversion-by-magnification device for converting by magnification the image data received in block unit by the image data receiving device in accordance with a block having a first dot width and a block having a second dot width, wherein the conversion-by-magnification device uses Bresenham's logic;

a panel memory for developing the convened image data converted by the conversion-by-magnification device; and a panel control device for writing the converted image data developed in the panel memory to the panel.

11. An image display apparatus according to claim 10, wherein the image data receiving device receives the image data in block unit, each block having a m dot width (m: an integer), and the conversion-by-magnification device selects an integer portion of the n as the first dot width when the image data is enlarged to data multiplied by n/m (n: a non-integer) and selects a value obtained by adding 1 to the first dot width as the second dot width.

12. An image display apparatus according to claim 11, wherein the image data to be displayed is data having a P dot width (P: an integer), the data is enlarged to data having an R dot width (R: an integer) and displayed on the panel, and the n equals to R×m/P.

13. An image display apparatus according to claim 10, wherein the conversion-by-magnification device executes conversion by magnification to each of horizontal and vertical sides of the image data.

14. An image display apparatus for converting image data of a first resolution output from a host side and displaying the image data with a second resolution on a display, comprising:

an input for inputting the image data from the host side in block unit, each block having a m dot width (m: an integer);

a block selection device for selecting a block having a first dot width using one of two continuous integers sandwiching a block having a second dot width using another integer, when the m dot width is converted to a dot width multiplied by n/m (n: a non-integer) based on a relation between the first resolution and the second resolution, wherein the selection device selects the block by using Bresenham's logic;

a scaling device for executing a scaling in accordance with the selected blocks respectively having the first and second dot widths in a mixed manner; and a display device for converting the input block having the m dot width based on the executed scaling, and displaying the block.

15. An image display system, comprising:

a host for executing an application and transmitting image data having a P dot width (P: an integer) in block unit, each block having the m dots width (m: an integer); and a display connected to the host which converts by magnification the image data having the P dot width to data having an R dot width (R: an integer), and displaying the image data, wherein the display includes: a scaling device for executing a scaling by using a block having a dot width of an integral value obtained by R×m/P and a block having a dot width of a second integral value obtained by adding 1 to the integral value wherein the scaling device uses Bresenham's logic; and a conversion device for converting by magnification the image data received from the host in block unit based on the scaling executed by the scaling means.

16. An image display system according to claim 15, wherein the scaling device executes the scaling by using the block having the dot width of the integral value, and the block having the dot width of the second integral value when the value obtained by R×m/P includes a fraction, and processes an error by mixing the block having the dot width of the integral value and the block having the dot width of the second integral value.

17. An image processing system, comprising:

a transmitting apparatus for transmitting generated original data having a P dot width (P: an integer) in block unit, each block having a m dot width (m: an integer); and an image processing apparatus for receiving the original data from the transmitting apparatus, subjecting the original data having the P dot width to conversion by magnification to data having an R dot width (R: an integer) and accumulating the original data, wherein the image processing apparatus includes: a scaling device for executing the scaling to the R dot width by using a block having a dot width of an integral value and a block having a dot width of an added integral value obtained by adding 1 to the integral value when a value obtained by R×m/P is a non-integral value including a fraction; a conversion device for subjecting the original data received from the transmitting apparatus in block unit to conversion by magnification in accordance with a corresponding block, based on the scaling executed by the scaling device; storing device for storing the converted data converted by the conversion device in a memory, and the scaling device uses Bresenham's logic.

18. An image processing system according to claim 17, wherein the scaling device executes the scaling by selecting one of the block having the dot width of the integral value and the block having the dot width of the added integral value, in order to eliminate an error based on the fraction.

* * * * *